Sept. 1, 1964 J. HICKL 3,147,483
DEVICE FOR RELEASING THE MOVEMENT OF A FILM CAMERA
Filed Dec. 21, 1961
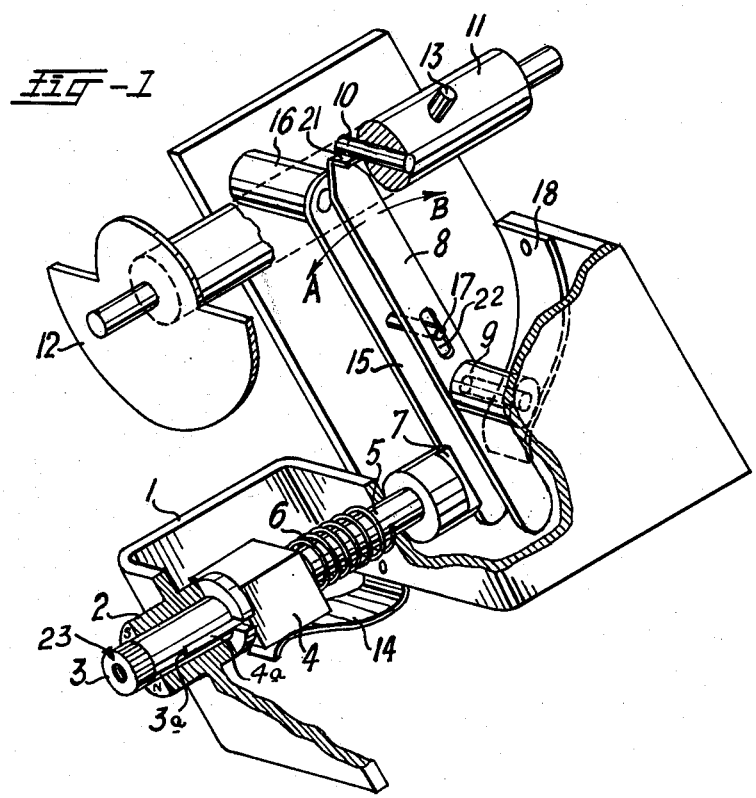
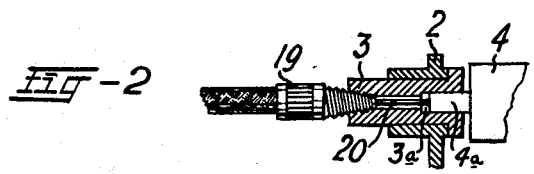
INVENTOR.
Jiři Hickl
BY Richard Curd
agt.

ated Sept. 1, 1964

United States Patent Office 3,147,483
Patented Sept. 1, 1964

3,147,483
DEVICE FOR RELEASING THE MOVEMENT OF
A FILM CAMERA
Jiří Hickl, Brno, Czechoslovakia, assignor to Meopta, narodni podnik, Prerov, Czechoslovakia
Filed Dec. 21, 1961, Ser. No. 161,151
Claims priority, application Czechoslovakia Jan. 19, 1961
5 Claims. (Cl. 352—169)

The invention relates to a shutter release device for motion picture cameras which is settable to provide for continuous operation or repeated exposure of the film, or for single frame exposure.

Previously known releasing devices for motion picture cameras have been usually designed either for only continuous operation, or a separate push-button has been provided for each type of operation. It has also been proposed to release the shutter mechanism for operation by actuation of a push-button, and to select the desired type of operation by manipulation of a separate control element. Such an arrangement was disclosed in the Czechoslovak patent specification No. 93,623 entitled "Switching Device for Obtaining Static or Cinematographic Shooting by Means of a Picture-Taking Film Camera, and also in U.S. Letters Patent No. 2,943,532, issued July 5, 1960, to T. Hashimoto.

It is an object of this invention to provide a device for releasing the shutter of a motion picture camera by means of a single, combined control element which is also manipulated for selecting the type of operation desired and may be actuated by a flexible cable release.

Another object of this invention is to facilitate the operation of a motion picture camera for either continuous or single frame exposure, and to facilitate the manipulation of the control elements for releasing the camera and for selecting the desired type of operation.

A further important object is to provide a release device of the described character in which the single control element is also movable to a position for blocking operation of the shutter in the event of inadvertent actuation of the control element. In accordance with an aspect of the invention, the shutter release device comprises a first lever mounted pivotally intermediate its ends on a bearing in such a manner that it forms a two-armed lever, the upper arm being adapted to swing in two opposite working directions, a second lever mounted at its upper end on a bearing to swing in a plane adjacent and parallel to that of the first lever, the movements of the two levers being coupled by means of a pin attached to the second lever and extending slidably in a slot in the upper arm of the first lever so that, during movement of the two levers, the lower ends thereof move in opposite directions, a first pin extending from the drive shaft of the camera mechanism and resting against a stop at the upper end of the first lever in its normal or rest position, said first pin being released to permit continuous rotation of the shaft when the upper arm of the first lever is swung in one direction, a second pin extending from the shaft in such a manner as to be engageable by the stop of the first lever when the upper arm of the latter is swung in the opposite direction so that in this case the shaft can perform only a part of one revolution, the remaining part of the revolution being completed only upon release of the second pin when the first lever is returned to its rest position, this return movement being accomplished by means of a spring which rests against the lower ends of both levers below the bearing of said first lever, and a release effecting element guided for turning and longitudinal movement toward and away from the lower ends of the levers, the release effecting element having an eccentric portion selectively engageable with the first lever alone, with the second lever alone or with both of the levers in response to turning of the element to corresponding positions, whereby longitudinal movement of the release effecting element toward the levers causes continuous exposure or single frame exposure depending upon whether said element is positioned for engagement with the first lever alone or the second lever alone, respectively, and the first lever is locked against any movement from its rest position by the release effecting element when the latter is positioned for engagement with both levers.

In accordance with a further feature of the invention, the release effecting element has a tongue or extrusion slidably received in a diametrical slot formed in a release button which projects from the housing of the camera and is turnable and axially movable relative to the latter so that the release effecting element is turned with the button and is moved longitudinally by the latter toward the levers in response to depression of the release button, and the release button has a tapped bore for receiving a cable release having an actuating pin to act on the tongue of the release effecting element for moving the latter toward the levers independently of the release button.

The invention will be best understood from the following detailed description of an illustrative embodiment to be read in conjunction with the accompanying drawing in which:

FIG. 1 is a schematic perspective view of a part of a motion picture camera incorporating a preferred shutter release device in accordance with the invention; and FIG. 2 is an axial sectional view of the release button of such device with a release cable attached thereto.

Referring now more particularly to FIG. 1, it is seen that the release button 3 is guided in the camera body or frame 1 by a guide bushing 2 in which it can be either rotated or axially displaced or depressed. The release button terminates in a flange which bears against the inner end of bushing 2 so as to limit outward axial movement of the button. A slot 3a extends diametrically across the inner end portion of the release button and slidably receives a flat extension or tongue 4a projecting from a block or square 4. To the rear or inner side of the block 4 is rigidly connected a guide rod 5 which is also guided in the camera frame 1. The rod 5 and button 3 are urged outwardly to their respective rest or idle positions by means of a spring 6 extending around rod 5 between frame 1 and block 4. The guide rod 5 has a release effecting element 7 which is secured to its inner end and arranged eccentrically with regard to the longitudinal axis of the guide rod.

The release device further comprises a pair of levers 8 and 15. The first lever 8 has a pivot pin intermediate its ends journalled in a bearing 9 anchored in the camera body. This lever acts as a two-armed lever the upper arm of which can swing forwards or backwards. The upper end of this lever is bent to form a stop 21 which in its rest position, is engageable by a first pin 10 projecting radially from the drive shaft 11 of the camera mechanism, so as to prevent rotation of such shaft by a conventional drive unit (not shown). The bearings of the shaft are also not shown in the drawing. In the illustrated example embodying the invention, the shaft 11 carries a rotary shutter 12 which, in the indicated position, prevents the light from passing through the objective and impinging on the sensitive layer of the film tape.

The second lever 15 is pivotally mounted, at its upper end, in the camera body by a bearing 16 for swinging in a plane parallel and adjacent to that of lever 8, and it is provided with a pin 17 which passes through a slot 22 in the first lever 8 above the pivot of the latter. Due to the described positional relationship of the pin 17 and the bearings 9, 16 of the levers 8, 15, the lower end portions of the levers 8 and 15 are made to move in opposite directions from the illustrated, parallel rest positions. A flat spring 18 bears against the lower ends of the two levers to urge the latter to the neutral or rest position.

If the release button 3 is rotated, such movement is imparted to the block 4 and thus also to the guide rod 5 and the eccentric release effecting element 7. It is thus possible to selectively position element 7 for engagement with either the lower end of the first lever 8 or the lower end of the second lever 15, or for engagement with both levers, simultaneously. The element 7 is held in any one of the selected positions by means of a flat spring 14 cooperating with the square block 4 and resting always on one of its flat surfaces.

If the element 7 is rotationally adjusted to bear against the first lever 8, and if the release button is depressed, the upper end of lever 8 is swung forward in the direction of the arrow A. The first pin 10 of the shaft 11 is released, and the shaft 11 is free to rotate uninterruptedly together with the camera mechanism coupled thereto, with the speed of such rotation corresponding to the normal frame frequency. If the pressure is removed from the release button, the release device is returned to its rest position by the action of the springs 6 and 18. The stop 21 at the upper end of the lever 8 comes again into the path of the first pin 10 which is thereby arrested to halt further rotation of shaft 11.

If the element 7 is rotated by means of the release button 3 to bear against the lower end of the second lever 15, depressing of the button causes rearward swinging of lever 15. Due to the engagement of pin 17 in slot 22, the upper end of the lever 8 is also swung back in the direction of the arrow B. This again releases the first pin 10 of the shaft 11, but moves the stop 21 into the path of a second pin 13 projecting radially from shaft 11 and being axially and angularly spaced relative to pin 10, thereby to halt rotation of the latter after only a portion of a revolution. When the pressure on the release button 3 is removed, the two levers return to their neutral or rest positions under the action of the springs 6 and 18. The second pin is freed by the stop 21 at the upper end of the second lever 8, and the shaft 11 is free to complete its revolution until its movement is again stopped by engagement of the first pin 10 with the stop on the upper end of the lever 8 at its neutral or rest position. During this cycle, only one frame of the film is tape exposed and subsequent frames can be individually exposed only if the described cycle is repeated.

When the element 7 is rotatably adjusted to the intermediate position to bear against the lower ends of both levers simultaneously, depressing the button 3 cannot effect swinging of lever 8 in either direction from the illustrated rest position where it blocks rotation of shaft 11. The foregoing results from the fact that, by reason of the pin 17 extending from lever 15 and engaging in slot 22 of lever 8, rearward swinging of the lower end of lever 8 causes forward swinging of the lower end of lever 15 and, conversely, rearward swinging of the lower end of lever 15 causes forward swinging of the lower end of lever 8. Thus, when element 7 engages the lower ends of both levers 8 and 15, rearward swinging of the lower end of either lever in response to depressing of button 3 is prevented by the simultaneous engagement of the other lever with element 7 which prevents the necessary forward movement thereof. The mechanism is thus guarded against inadvertent release of the camera if the release button is accidentally depressed.

The rotational position of the release element 7 is indicated on the outside of the camera in a suitable manner, for example, by a pointer 23 on the outer surface of button 3 cooperating with suitably located indicia, such as, the illustrated letters "N" and "S," on the outer end surface of guide bushing 2 to represent the position of button 3 for normal or continuous operation or exposure and for single frame exposure, respectively. The end surface of bushing 2 will also have an indicia (not shown) angularly midway between the letters "N" and "S" to represent the locked position of the button.

The release button 3 is provided with a tapped bore opening into slot 3a and into which can be screwed a flexible cable release 19. When the cable release is operated, its release pin 20 acts on the front face of the tongue 4a of block 4 (FIG. 2) to move the latter rearwardly relative to the release button. The rearward displacement is transferred to the guide rod 5 and the element 7 which then presses against one or the other, or both of the levers in the manner described above. The possibility of rotating the release button for selecting the desired mode of operation of the release device is preserved even in this case.

What I claim is:
1. A release device for a motion picture camera having a drive shaft urged to rotate for operating a shutter: said release device comprising first and second abutments rotatable with said drive shaft and being spaced apart both circumferentially and in a direction at right angles thereto;

a first lever pivotally mounted intermediate its ends and having a stop at one end disposed in the path of rotation of said first abutment when said first lever is in a rest position to prevent operation of the shutter, swinging movement of said one end of the first lever from said rest position, in one direction, serving to withdraw said stop from the paths of rotation of both of said abutments so as to permit continuous operation of the shutter and, in the other direction, serving to move said stop into the path of rotation of said second abutment so as to permit a single operation of the shutter;

a second lever extending alongside said first lever and pivotally mounted at one end adjacent said one end of the first lever for swinging in a plane parallel to that of the swinging movement of the latter;

coupling means connecting said first and second levers and causing the other ends of said levers to move in opposite directions upon movement of said first lever from said rest position;

spring means acting on said levers adjacent said other ends thereof for urging said first lever to said rest position; and a release effecting member movable longitudinally toward and away from said other ends of the levers and turnable about an axis parallel to the directions of longitudinal movement, said release effecting member having an end portion which is eccentric with respect to said axis of turning so as to be engageable selectively with said other end of only said first lever, with said other end of only said second lever and with said other ends of both levers simultaneously in response to turning of said release effecting member to corresponding rotated positions, whereby longitudinal movement of the latter toward the levers selectively causes continuous operation of the shutter, single operation of the shutter and is blocked to prevent operation of the shutter when said release effecting member is turnably positioned for engagement of its eccentric end portion with only one of the levers, with only the other of the levers and with both of the levers, respectively.

2. A release device for a motion picture camera as in claim 1; wherein said first and second abutments are in the form of pins projecting radially from the drive shaft at angularly and axially spaced apart locations.

3. A release device for a motion picture camera as in claim 1; wherein said coupling means connecting said first and second levers includes a pin projecting from said second lever and being slidable in a longitudinal slot located in said first lever between the pivoting axis of the latter and said one end of the first lever.

4. A release device for a motion picture camera as in claim 1;

further comprising a locating member secured to said release effecting member and having flat surfaces spaced around said axis of turning and corresponding to said rotated positions of the release effecting member, and spring means engageable with said flat surfaces of the locating member for yieldably holding said release effecting member in any of said rotated positions.

5. A release device for a motion picture camera as in claim 1;

further comprising an actuating button axially aligned with said release effecting member and mounted for axial and turning movements, said button having a diametrical slot opening at the end thereof facing toward said release effecting member and a tapped bore extending from the other end of the button and opening into said diametrical slot, and a tongue extending from said release effecting member at the end of the latter remote from said eccentric end portion and received in said diametrical slot to rotatably couple said release effecting member to said button, said release effecting member being alternatively movable toward the levers by depressing said button and by a cable release secured in said tapped bore and acting axially against said tongue.

References Cited in the file of this patent
UNITED STATES PATENTS

| | | |
|---|---|---|
| 1,407,357 | Tartara | Feb. 21, 1922 |
| 1,960,062 | Morsbach | May 22, 1934 |
| 1,977,134 | Lingg | Oct. 16, 1934 |
| 2,413,443 | Frankel | Dec. 31, 1946 |
| 2,943,532 | Hashimoto | July 5, 1960 |
| 2,986,067 | Gopfert | May 30, 1961 |